W. H. EDSALL & F. LA O. LATHROP.
CURTAIN ROD SOCKET.
APPLICATION FILED APR. 23, 1912.
1,036,813.
Patented Aug. 27, 1912.
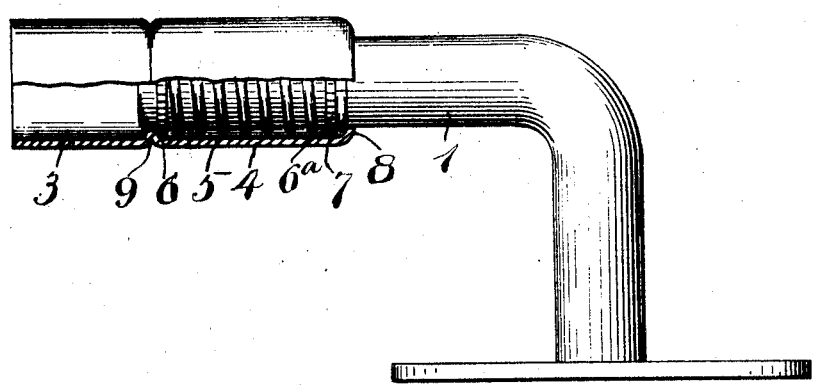
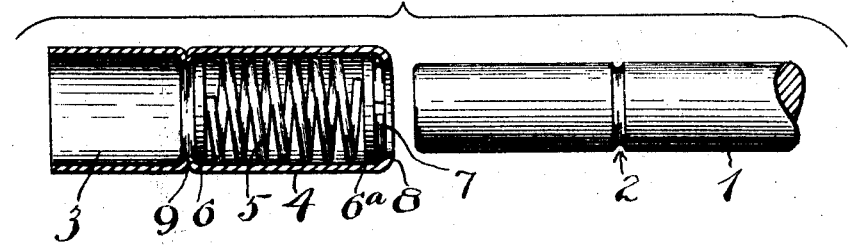
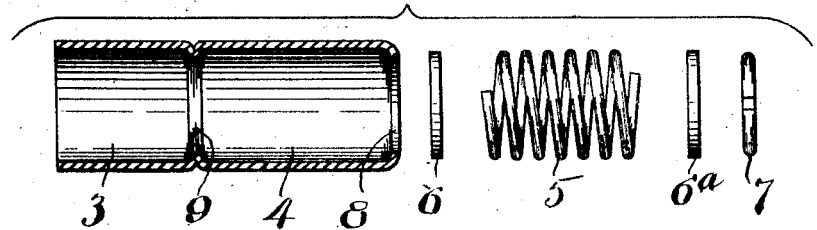

UNITED STATES PATENT OFFICE.

WILLIAM H. EDSALL AND FRANK LA OTIS LATHROP, OF WALLINGFORD, CONNECTICUT, ASSIGNORS TO H. L. JUDD COMPANY, OF WALLINGFORD, CONNECTICUT, A CORPORATION OF NEW YORK.

CURTAIN-ROD SOCKET.

1,036,813.   Specification of Letters Patent.   Patented Aug. 27, 1912.

Application filed April 23, 1912. Serial No. 692,690.

*To all whom it may concern:*

Be it known that we, WILLIAM H. EDSALL and FRANK LA OTIS LATHROP, citizens of the United States, residing at Wallingford, county of New Haven, State of Connecticut, have invented certain new and useful Improvements in Curtain-Rod Sockets, of which the following is a full, clear, and exact description.

This invention relates to an improved curtain rod bracket, the main object being to provide a structural improvement which facilitates very much the manufacture of such devices and results thereby in substantial economies. This construction is an improvement on the construction set forth in U. S. Letters Patent No. 1,019,232 of March 5, 1912.

In the drawings Figure 1 is a side elevation of the invention partly broken away and somewhat enlarged. Fig. 2 is a view of the same parts as they appear partially assembled. Fig. 3 is a group of several separated parts or details.

1 represents the bracket rod support, or socket guide, said rod having an annular groove 2 therein. The socket member comprises a tube having a forward curtain rod receiving socket portion 3 and the bearing sleeve portion 4 within which is located a spring 5.

6—6ª are washers at each end of the spring.

7 is a separate spring ring which normally will contract to a diameter slightly less than the diameter of the rod 1. The groove 2 is such as to receive the spring ring 7. The parts of the socket are assembled, as shown in Fig. 2. The spring, washers and ring are placed within the sleeve portion 4 of the tube and then the end of the tube is rolled in as at 8 while the side of the tube is indented or rolled in as at 9 thus retaining all the aforesaid parts within the sleeve portion 4 of the socket preparatory to applying the parts to the bracket rod 1. When it is desired to assemble the socket on the rod 1, the end of said rod is forced into the rear end of the socket and through the split ring 7 therein, which expands. The rod then passes through the washer 6ª, the spring 5 and the washer 6. The socket is pushed farther on until the ring 7 snaps into the groove 2, when the parts become thereby permanently assembled for use. It will now be seen that manual pressure upon the outer end of the tubular socket will cause the same to slide back on the rod 1 compressing the spring 5. When pressure is released, the spring projects the socket ahead into the curtain rod holding position shown in Fig. 1. As will be seen, invention in this particular case resides mainly in the construction and arrangement of parts whereby the socket may first be completely formed with its contained parts fully housed therein, after which it may be easily slipped on to the bracket rod in its final position. The washers act to properly space the tube from the bracket rod 1. The washer 6 slides with the tube on said rod as it moves back and forth. At the same time the tube slides on the washer 6ª which is held stationary against the ring 7, thus the washers have a guiding function as well as a centering function. It is obvious that in some instances the washer 6 might be omitted; the spring then bearing at one end against the pressed-in intermediate portion 9 of the tube. Indeed in some forms both washers might be entirely omitted, the contracted parts of the tube serving to center and bear upon the bracket rod 1. The best results however, are obtained by providing the washers since the device is rendered more durable thereby.

What we claim is:

1. In a curtain rod socket, a bearing rod, a tube having an intermediate contraction and an end contraction, a spring and a split ring within said tube and held between said contracted portions, said split ring being of less internal diameter normally than the diameter of said rod and a recess in said rod to receive said ring, said rod passing through the contracted portions of said tube.

2. In a curtain rod socket, a bearing rod, a tube having an intermediate contraction and an end contraction, a spring and a split ring within said tube and held between said contracted portions, said split ring being of less internal diameter normally than the diameter of said rod and a recess in said rod to receive said ring, said rod passing through the contracted portions of said tube, and a washer arranged at one end of the spring.

3. In a curtain rod socket, a bearing rod, a tube having an intermediate contraction and an end contraction, a spring and a split ring within said tube and held between said contracted portions, said split ring being of less internal diameter normally than the diameter of said rod and a recess in said rod to receive said ring, said rod passing through the contracted portions of said tube, and washers within said tube at each end of said spring.

WILLIAM H. EDSALL.
FRANK LA OTIS LATHROP.

Witnesses:
GEORGE W. BAUMAN,
W. E. ATKINSON.